United States Patent [19]
Husted

[11] Patent Number: 5,226,672
[45] Date of Patent: Jul. 13, 1993

[54] WEB RESTRAINT SYSTEM

[76] Inventor: Royce H. Husted, 711 Lakeside Dr., Wheaton, Ill. 60187

[21] Appl. No.: 683,993

[22] Filed: Apr. 11, 1991

[51] Int. Cl.$^5$ .............................................. B60R 21/06
[52] U.S. Cl. ...................... 280/749; 280/733
[58] Field of Search ............... 280/749, 753, 803, 804, 280/742, 733

[56] References Cited

U.S. PATENT DOCUMENTS

| | | | |
|---|---|---|---|
| 3,831,975 | 8/1974 | Mednikow | 280/749 |
| 3,836,168 | 9/1974 | Nonaka et al. | 280/733 |
| 4,906,020 | 3/1990 | Haberer | 280/749 |

Primary Examiner—Robert P. Olszewski
Assistant Examiner—Kenneth Noland
Attorney, Agent, or Firm—Nicholas A. Camasto

[57] ABSTRACT

A protection system for an occupant seat in a vehicle has a net stored in the headliner above and forward of the front seat. The net is secured at its four corners to cables that are trained along the inside of the vehicle to a pair of pistons in barrels that are located beneath the vehicle. A sensor electrically triggers firing of charges that propel the pistons in the event of a vehicle crash in a wide angle frontal plane. The pistons tension the cables to deploy the net across the front (and sides) of the occupant seat to restrain movement of any occupants in the seat. The cables are latched to maintain the net in its deployed position. A quick release mechanism enables an occupant to release the net after a crash impact or series of crash impacts. Additional protection systems may be provided for additional occupant seats in the vehicle.

11 Claims, 6 Drawing Sheets

WEB RESTRAINT SYSTEM

BACKGROUND OF THE INVENTION AND PRIOR ART

Crash restraint systems for automotive occupants have been used for a number of years. Presently most states mandate seat belt usage in passenger vehicles. Clearly, lap belts and shoulder belts have proven their effectiveness in reducing injury by restraining occupant movements resulting from impact forces experienced by the vehicle during a crash. It is also common knowledge that many individuals do not use seat belts despite the overwhelming evidence of their effectiveness in preventing serious injury and death in crash situations. Hence the quest for a true passive restraining system, i.e. a system that does not require the participation of the vehicle occupant.

The so-called "air bag" was originally thought to be such a system, but later studies have shown the need to use seat belts with an air bag. In the event of a crash involving a certain minimum level of impact force, a container of highly pressurized gas (such as nitrogen) is opened by a motion sensor to rapidly inflate a bag that mushrooms out of the steering column in front of the driver. There is also a system that uses a gas developing chemical reaction for inflation. The bag fills very rapidly and results indicate that it is effective in preventing death and critical injury in vehicles involved in head-on collisions.

The air bag system is however difficult to deploy for an occupant other than the drive because of the much larger volume that must be covered, e.g. there is no steering wheel column, from which the bag emerges, positioned close to the occupant as is the case with the driver of the vehicle. Similarly, passengers in the rear occupant seat of the vehicle are offered little protection from the presently configured air bag system. The system also does not deal with a third front seat occupant which the vehicle may carry. The air bag also has a psychological drawback in that the occupant has his vision completely obstructed when the air bag mushrooms in his face. Quite clearly, the driver of such a vehicle is thwarted in attempting to control the vehicle during the crash. This can be of extreme importance in multiple vehicle crashes where continued maneuvering of the vehicle could be critical. Additionally, air bags are ineffective in side collisions and in many angle collisions, which comprise the largest number of crashes. Additionally, the air bag (of necessity) rapidly deflates when deployed and is ineffective to protect against subsequent impacts. A likely to occur scenario is one in which a vehicle is struck at an angle and forced into an opposing traffic lane. If the air bag deploys at the first impact, it will be useless in the likely upcoming head-on collision. Finally, the air bag is expensive and very difficult to accommodate in the vehicle.

The present invention moves a web, such as a net, from an out-of-the way stored position to a deployed position embracing the occupant seat in the event of a high impact force over a wide angle frontal collision plane (about 180 degrees). Since the web extends across the occupant seat of the vehicle, it is effective to restrain movements of all occupants in that occupant seat. The web is out of the normal view of the occupants when in the stored position and permits continued visibility and vehicle control when deployed. The net also restrains lateral occupant movement and is latched, when deployed, to continue to protect the occupant in the event of multiple collisions. (The inventive web restraint system is also readily adapted to protect other rows of occupant seats, is easily installed (and replaced) and is very low in cost.)

In the preferred embodiment, the web comprises a generally trapezoidal shaped net of plastic material, such as nylon, with a weave that is sufficiently coarse so as to permit substantially full vision, when deployed. The web is stored above and forwardly of the occupant seat and is concealed in the vehicle roof. The deployed web permits the driver to exercise continued control over the vehicle since his forearms and hands are free to manipulate the steering wheel and his vision is unimpaired. (With an air bag, the driver's arms are immediately forced apart, thus breaking his grip on the steering wheel.) All of the operating components of the inventive web restraining system are readily concealed in the headlining, interior molding and side door pillars of the vehicle. The design of the vehicle is not adversely affected and even such features as sun (moon) roofs may be incorporated. The web itself may also include reinforced sections to simulate the actions of lap and shoulder seat belts.

OBJECTS OF THE INVENTION

A principal object of the invention is to provide an improved method and apparatus for protecting occupants of a vehicle.

Another object of the invention is to provide a system and method of restraining movements of occupants in a vehicle for impact forces over a wide angel frontal collision plane.

A further object of the invention is to provide an improved crash protection system that permits a driver to exercise control of his vehicle during a crash.

A still further object of the invention is to provide a low cost protection system for automotive vehicle occupants.

BRIEF DESCRIPTION OF THE DRAWINGS

These and other objects and advantages of the invention will be apparent upon reading the following description in conjunction with the drawings, in which.

DESCRIPTION OF THE PREFERRED EMBODIMENT

Figure 1:
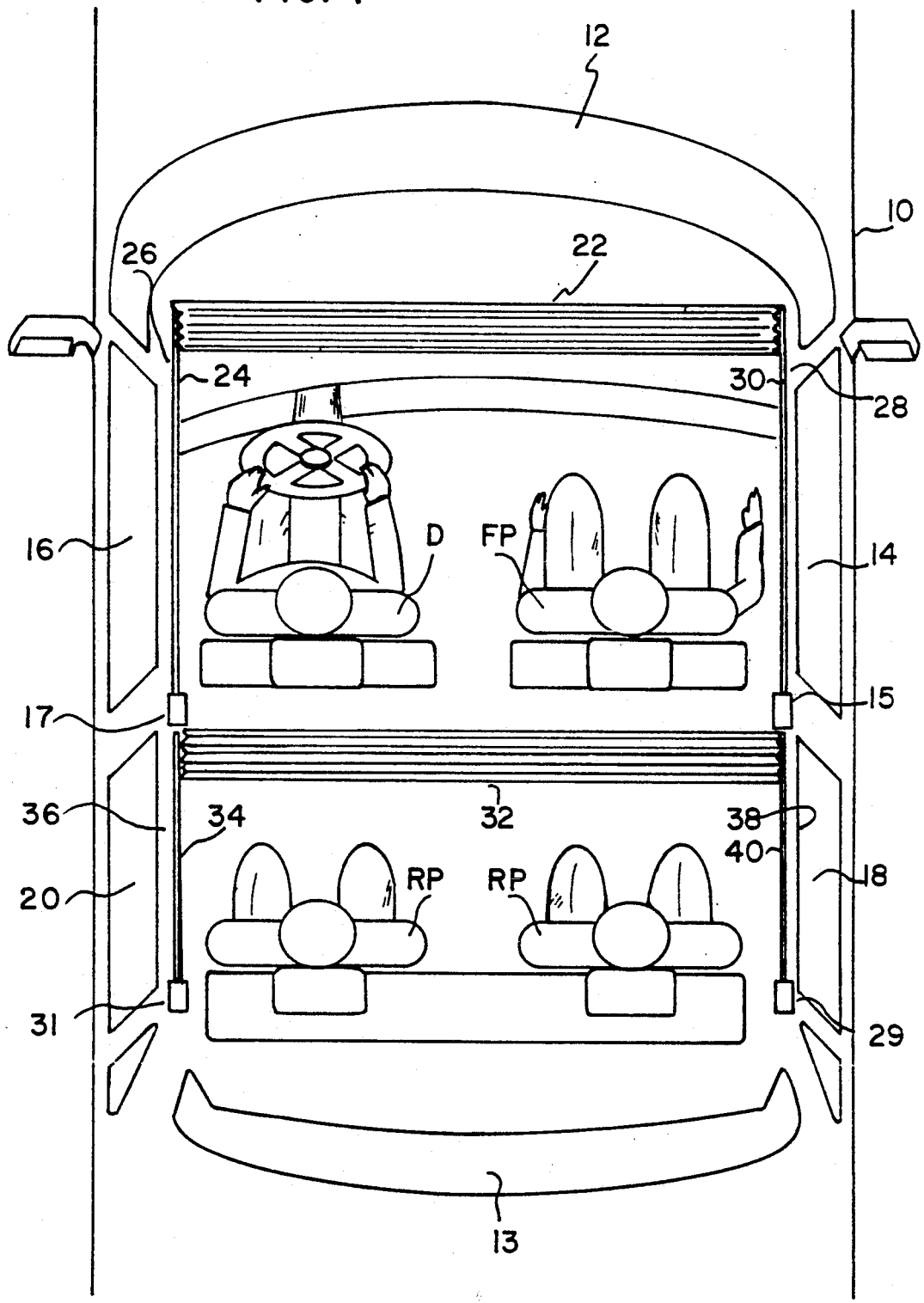
FIG. 1 is a partial cutaway top view of a passenger vehicle with four occupants seated in two occupant seats, each of which is protected by a restraint system constructed in accordance with the invention.

Referring to FIG. 1, a partial top view (with the roof cut away) of a vehicle 10 is shown. A front windshield 12, a rear windshield 13, front doors 14 and 16 and rear doors 18 and 20 comprise the major portions of the vehicle 10. Two door or center pillars 15 and 17 are located on opposite sides of vehicle 10 intermediate the front and rear doors. Two rear quarter panel pillars 29 and 31 are illustrated at the rear of the rear doors 18 and 20, respectively. A web 22 is shown in its folded or stored condition above and forward of a driver D and a front passenger FP. A similar web 32 is illustrated in a stored position above and forward of two rear passengers RP. The occupants of the vehicle, i.e. D, FP and RP, are seated in respective front and rear occupant seats. The front occupant seat may comprise split seats or bucket seats, for example. The term occupant seat means generally the "front" or "rear" seat of a standard sedan type vehicle, and comprises both bench type seats and split seats. In a van, for example, more than two rows of occupant seats may be provided. Two each of the four corners of a generally trapezoidal shaped net or web 22 are connected at one side by cables 24, 26 and on the opposite sides by cables 28, 30. The pairs of cables are trained along the headliner in troughs (not illustrated) of the vehicle and down along pillars 17 and 15, respectively. Similarly, web 32 is connected at its ends to cables 34, 36 and 38, 40 at its opposite ends, which cables are trained in a trough along the automobile headliner and down along rear pillars 31 and 29, respectively. The cables are small in diameter and may be readily concealed with the junctures of the vehicle upholstery. It will be noted that the shape of the net or web 22 should conform generally to the vertical cross section of the vehicle adjacent to the front of the occupant seat.

Reference to FIGS. 2-5, taken together, should be made at this point. It should be noted that while one side of the web restraint structure is generally described, similar structure is situated and operated on the opposite side of the vehicle. The web or net 22 is preferably packed in an accordion configuration to minimize storage space and assure easy and unencumbered deployment. Since the web is made of lightweight plastic, such as nylon or Kevlar TM cording, it may be readily packed and stowed in a slot in the roof area of a vehicle above the interior headliner and out of sight of occupants of the vehicle. A full width slot 19 extends along the front of the headliner. A smooth long cylinder 21 (or formed curved surface) extends across slot 19 to permit the web 22 to be smoothly and rapidly pulled from its stored position to its deployed position. Small diameter cables 24 and 26, which are preferably made of steel, are trained in a trough (not shown) in the vehicle roof along the headliner side trim and down along center pillar 17. Cable 26 is joined to cable 24, in the preferred embodiment, by a breakaway connector 25, or other suitable slip device, and cable 24 continues down along pillar 17 to an explosive means 50 positioned below the floor 11 of the vehicle. Specifically, cable 26 is passed through a fixed guide and latch 27, which is secured to the vehicle, and passed around a fixed guide 23. Cable 24 at the top of pillar 17 rests in a curved portion 41 in the trough. A plurality of cylindrical obstructions 43 are firmly secured at spaced positions along cable 24 for securely latching cable 24 as the web 22 is deployed. Depending upon the forward orientation of the occupant seat and the number and sizes of occupants in the seat, one or more of obstructions 43 will pass through a latch 42 before the net is completely deployed. Since it is desired to quickly draw net 22 against latch 27, a stop 22a is provided on the upper end of the web 22. The stop 22a may be similar to obstruction 43. As mentioned, the discussion applies to the other side of web 22 and vehicle 10 and similar apparatus is provided for simultaneously tensioning the cables 28 and 30 in the event of a crash.

Explosive means 50 include a charge cannister 52 for propelling a projectile, such as a piston 54 along a cylinder or barrel 56 in response to ignition of charge cannister 52 by a sensor means 70. Sensor means 70 preferably comprises one or more conventional motion sensors, similar to those used in present day air bag systems, for sensing a crash impact (over a predetermined minimum force level) over a wide frontal angle, i.e. within a 180 degree angle, by closing a switch (not shown). The switch couples the DC voltage from the battery system (not shown) to an igniter in the charge cannister 52 to propel the projectile or piston 54 along barrel 56. A curved guide 58 is mounted in the end of barrel 56 for guiding cable 24 therearound to minimize drag as it is carried down barrel 56 by piston 54. Cable 24 is looped around a pin 54a in piston 54 and attached, by any suitable means to the end of barrel 56, as indicated at 59. This arrangement permits the travel of cable 24 to be accommodated while keeping piston 54 within barrel 56. As may be readily seen, cable 26 travels a shorter distance than cable 24 since cable 26 locks as soon as cable stop 22a engages latch 27. Continued movement of piston 54 results in cable 24 threading around pin 54a until net 22 is fully deployed. A seal 39, such as may be provided by a silicone compound or the like, is provided to seal the hole in floor 11 of vehicle 10 through which cable 24 passes to reach explosive means 50, which is preferably located under the vehicle 10. The releasable latch 42 operates to pass obstructions 43 from cable 24 in one direction and to lock when an obstruction 43 tries to move in the opposite direction. A quick release lever 72 enables the occupant to release the tension in cable 24 and the net 22 after its deployment in response to a suitably larger crash impact force. An end cap 57 seals the end of barrel 56 from the elements. The end cap is immediately dislodged in the event of firing of charge cannister 52 and is secured by a strap 57a, or the like, to prevent its loss. It will be appreciated that the direction of travel of piston 54 generally assists in deploying net 22 since, the impact sensor will only response as a result of a crash in the frontal plane. It should also be noted that a single explosive means may be utilized by suitably coupling the cables 28, 30 from the other side of the occupant seat to piston 54. Similarly, the web restraint systems for other occupant seats may be coupled to a single explosive means.

The details of piston 54, barrel 56 and charge means 52 are omitted, since they are believed to be well known in the art and are not part of the present invention. Any well known means for rapidly tensioning the cables 24, 26 (and 28, 30) responsive to a predetermined impact force on the vehicle may be used. Such means may include compressed gases and chemical reaction systems as are currently employed in air bag deployment systems.

Figure 6:
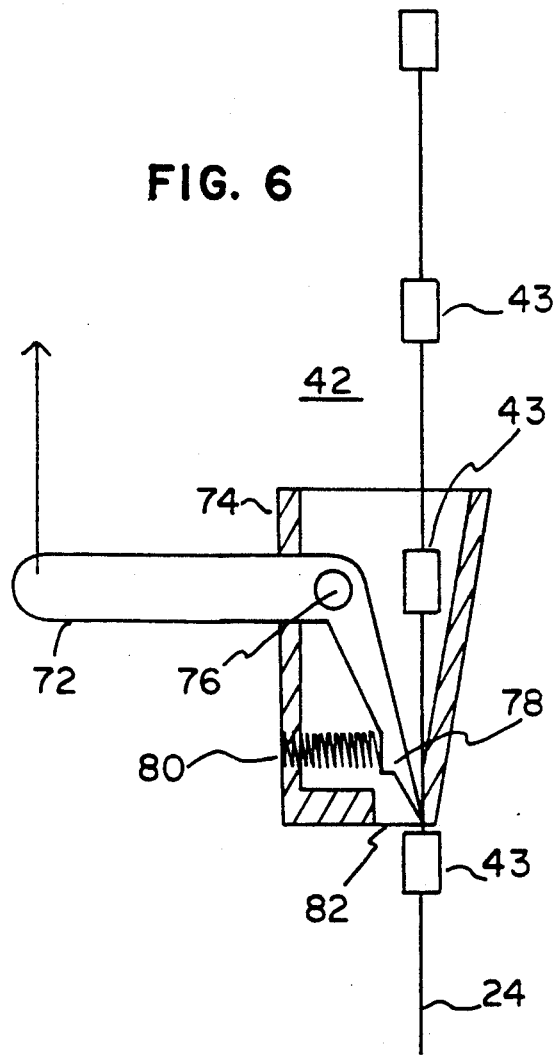
FIG. 6 shows a releasable latch arrangement useful with the invention.

In FIG. 6, a form of releasable latch 42 is illustrated. The releasable latch includes a quick release lever 72, which is pivotally mounted on a base 74 by means of a pivot pin 76. A jaw 78 is biased against cable 24 by a spring 80. Jaw 78 opens to pas obstructions 43 moving in one direction and closes due to the bias of spring 80 to prevent reverse movement of cable 24. When closed, jaw 78 forces the relevant one of obstructions 43 against the wall of opening 82 in the base 74 to lock the cable 24 from reverse movement.

Figure 7:
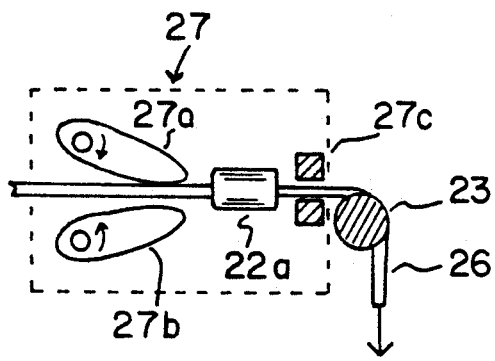
FIG. 7 shows a lock arrangement for the upper portion of the web.

FIG. 7 shows a form of latch 27. It includes a pair of opposed, spring biased levers 27a and 27b which open to pass stop 22a as cable 26 is moved in the direction of the arrow. A fixed stop 27c prevents further travel of stop 22a and reverse movement of the stop 22a locks the cable 26. It should be noted that the invention is not concerned with the type of latch mechanism employed and the one illustrated is but one of many well known one-way devices that may be employed. The latch may be released with a suitable tool after deployment, for example, by a serviceman.

Figure 8:
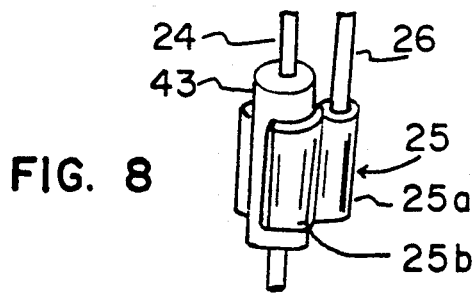
FIGS. 8 and 9 are partial perspective views of a breakaway cable connector.
Figure 9:
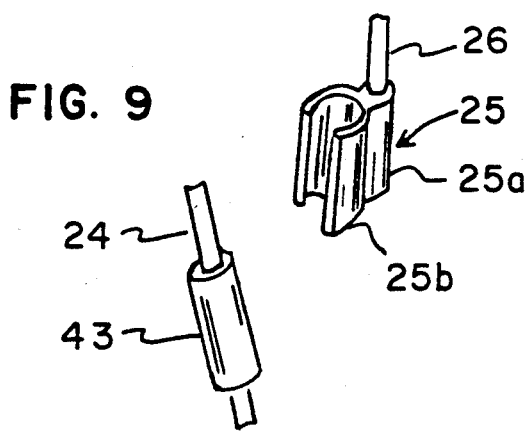

FIGS. 8 and 9 illustrate a form of breakaway connector 25 that may be used with the invention. The connector has a portion 25a that is firmly secured to the end of cable 26 and a cylindrical portion 25b that embraces one of the obstructions 43 in a gripping manner. AS the web 22 is being deployed initially, the tension in cables 24 and 26 is insufficient to overcome the gripping force of portion 25b on obstruction 43 and cables 24 and 26 move together. When stop 22a on cable 26 engages fixed stop 27c, however, the tension very rapidly rises and overcomes the gripping forces of portion 25b and cable 24 breaks away from cable 26. The advantage of the arrangement is that only a single cable needs to be pulled by the projectile or piston and that controlled deployment of the web is obtained in that the top of the web is rearwardly moved into position before significant downward movement occurs. This assures that the web will be properly deployed to embrace the occupant seat.

Figure 2A:
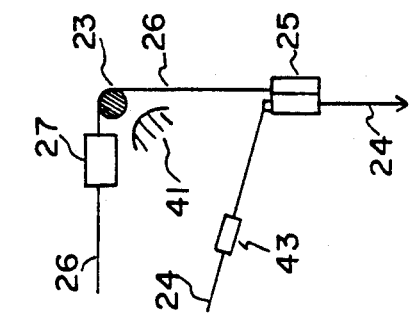
FIG. 2A is an enlarged section of FIG. 2 immediately after a vehicle impact.
Figure 2:
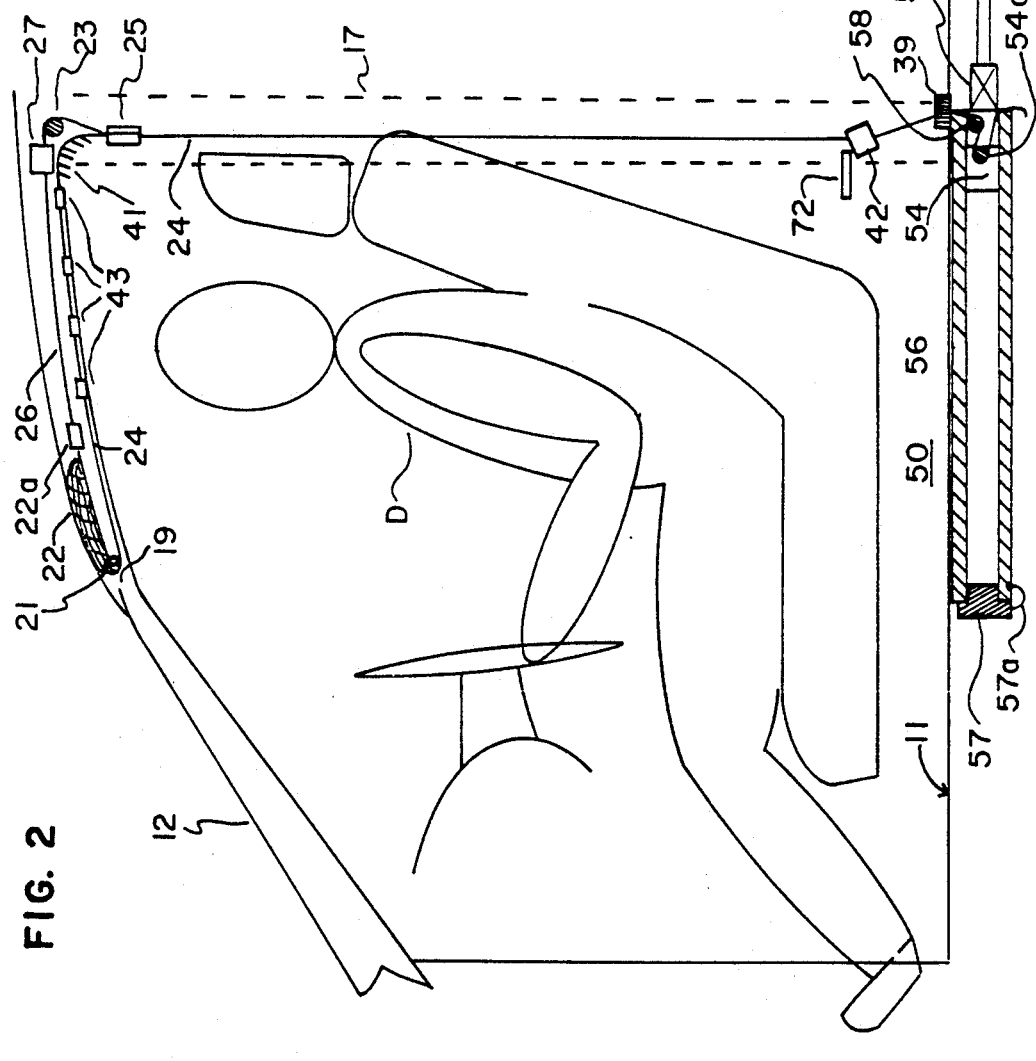
FIG. 2 is a partial cutaway side view of the driver and the restraining system of the invention in its stored position.
Figure 3:
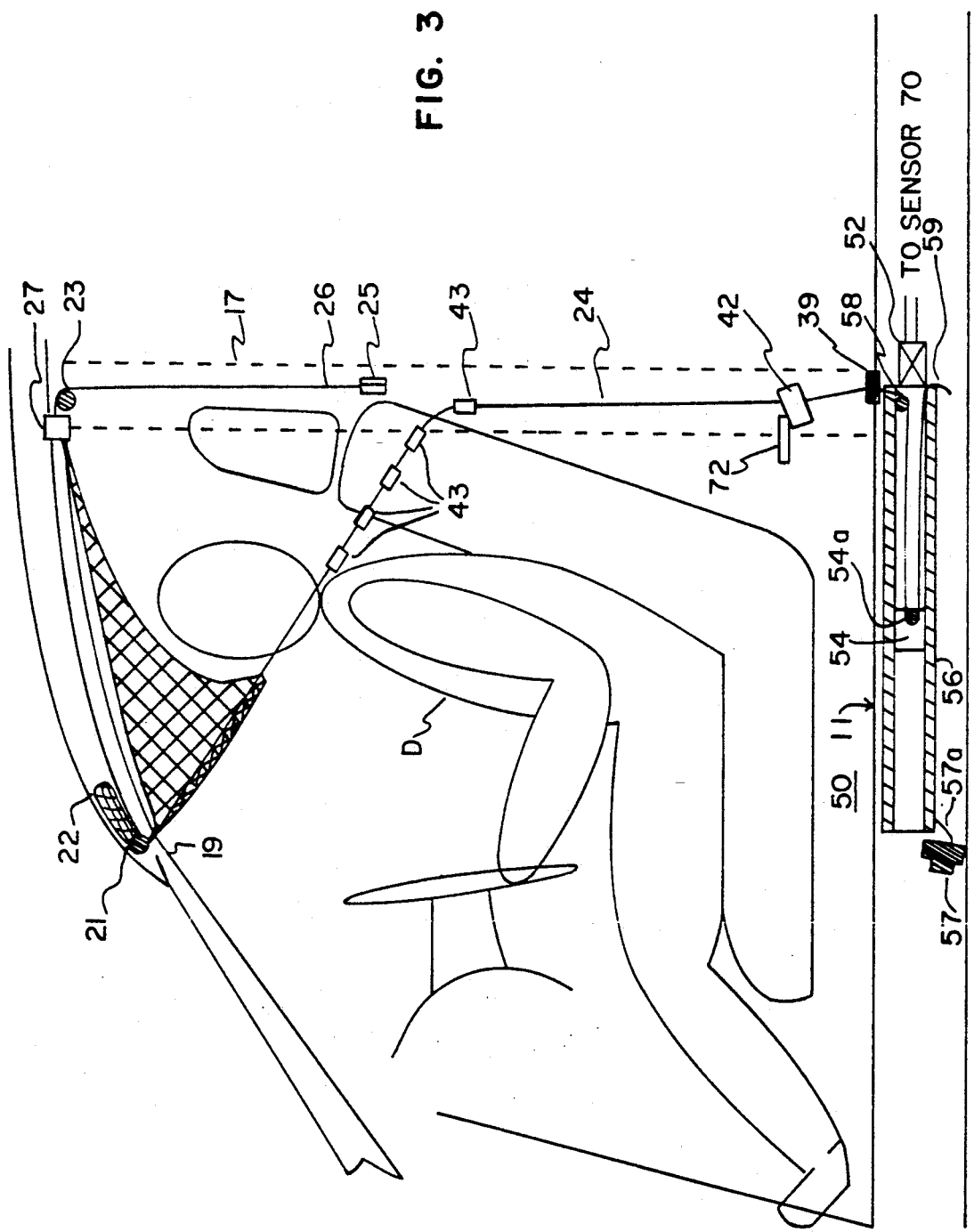
FIG. 3 is a view similar to FIG. 2 showing the web deployed to the point of separation of a breakaway cable connector.
Figure 4:
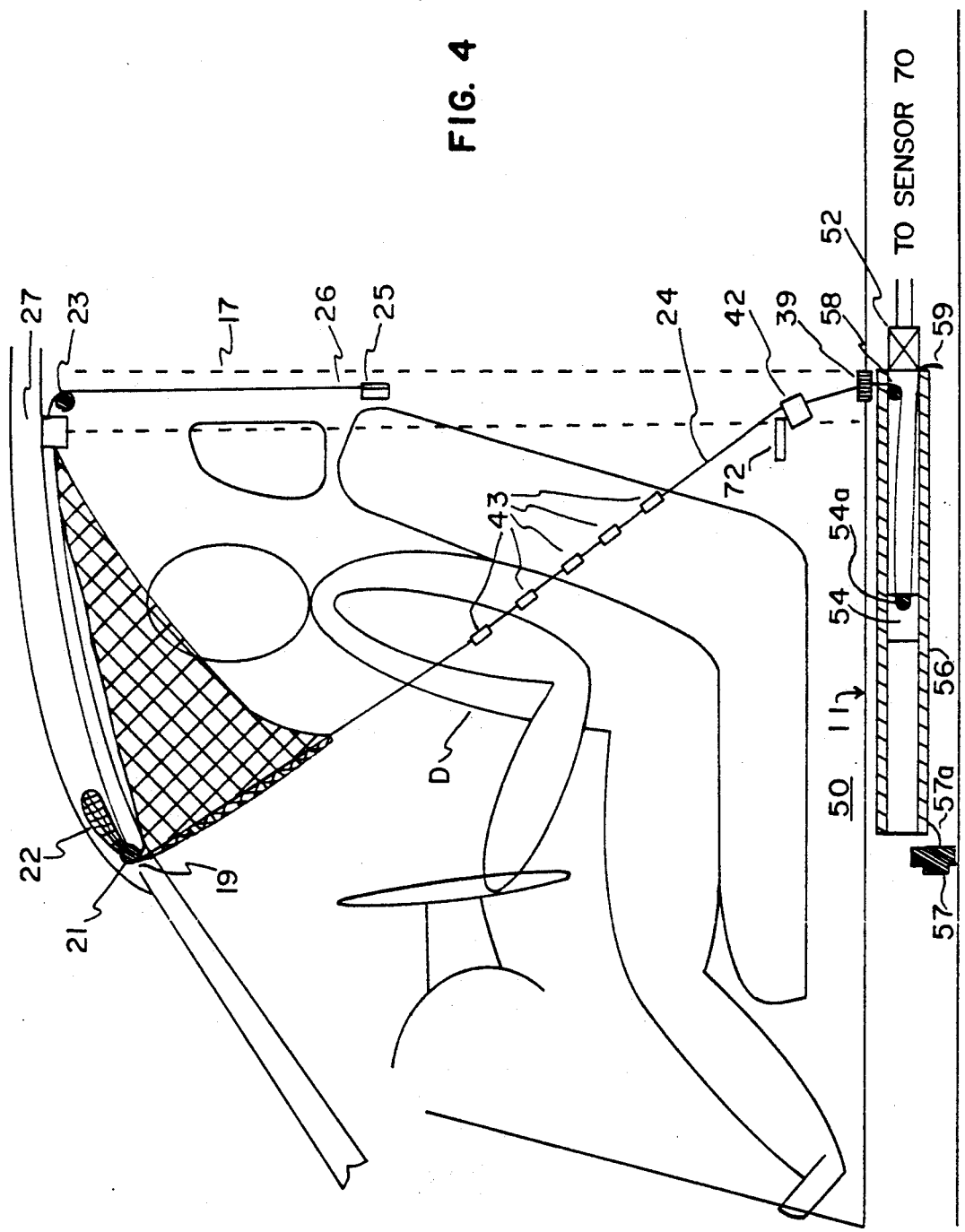
FIG. 4 is a similar view showing continued deployment of the web.
Figure 5:
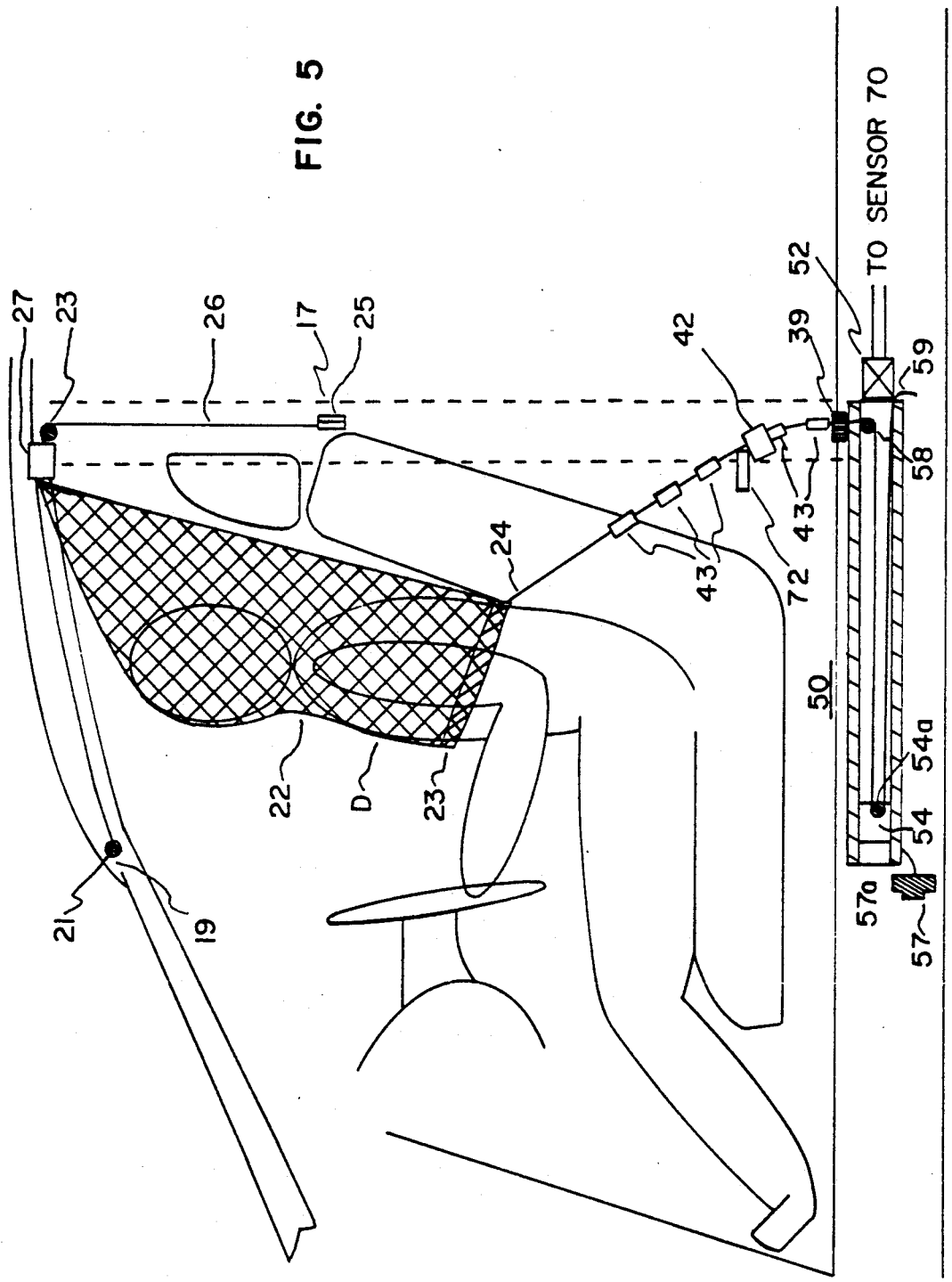
FIG. 5 is a similar view showing full deployment of the web.

In operation, the web restraint system is disposed in a stored position as illustrated in FIGS. 1 and 2. In response to a suitably larger impact force on the vehicle from within a frontal angel of about 180 degrees, sensor means 70 closes a circuit to the igniter in charge cannister 52. Firing of charge cannister 52 propels piston 54 along barrel 56, carrying with it cable 24, and initially cable 26. If another explosion means is employed for cables 28 and 30 on the opposite side of the occupant seat, a similar charge cannister is fired by the same signal from sensor means 70 to propel another piston along its associated barrel. AS cables 24 and 26 are rapidly tensioned, they pop out of the trough (and cable 24 is freed from curved portion 41 as net 22 is pulled out from its stored position in the roof of the vehicle. This is best seen in FIG. 2A. Note that the angle between cables 24 and 26 rapidly increases so that the rearward movement of the top of the net 22 is much faster than its downward movement of the bottom of net 22. (See FIG. 3.) Movement of cable 26 is terminated when stop 22a reaches latch 27 which is affixed to the upper part of vehicle 10. At this point, cable 24 breaks free of cable 26 (FIG. 3) and the bottom of the web or net 22 is rapidly moved downward to embrace the occupant seat.

Cable 24 continues to be pulled as piston 54 travels in barrel 56. The force of piston 54 draws the net 22 securely about the occupant seat and its occupants and one of the obstructions 43 locks the cable 24 in latch 42. The net 22 remains in this protective, fully deployed position until tension is released by lifting release lever 72. As mentioned, latch 27 may be reset by a serviceman inserting a suitable tool therein. Alternatively, it may include a reset handle to permit resetting by an occupant after the crash.

Also as mentioned, the explosive means 50 for accelerating piston 54 is not essential to the invention. Suffice it to say that the art includes suitable apparatus to make the disclosed arrangement function to rapidly tension the cable in response to a signal from sensor means 70 signaling a crash impact force. Also, multiple web restraint systems may be employed with one or more systems for rapidly pulling the cables taut to deploy the web or net. A purely mechanical stored energy system with a release pawl mechanism is also contemplated for use with the invention. Should the need for a shorter projectile travel arise, a multiple sheave type pulley arrangement may be used for the projectile in barrel 56. It will also be noted that the web or net 22 may be shaped such that the lower corner adjacent to the passenger portion of the occupant seat comes down lower to embrace any occupant therein across the lower abdomen for maximum support.

What is claimed is:

1. A protection system for restricting occupant movement with respect to a vehicle subjected to a high impact force from a crash or the like comprising:
   a net extending across said occupant seat in a stored position out of the normal view of an occupant in said seat;
   sensing means for sensing a high impact force on said vehicle;
   means, responsive to operation of said sensing means, for deploying said net against said occupant seat to restrain movement of any occupants seated therein;
   a plurality of cables connected between said net and said deploying means, said plurality of cables being concealed when said net is in said stored position; and
   latch means for securing said net in its deployed position.

2. The system of claim 1 wherein said deploying means includes explosive means mounted to said vehicle, said explosive means including a projectile coupled to said plurality of cables and being activated by said sensing means.

3. The system of claim 1 wherein said net has a weave sufficiently open to be substantially transparent to an occupant.

4. The system of claim 1 wherein said net includes reinforced portions for simulating a seat belt restraint.

5. The system of claim 1 in which said vehicle includes an additional occupant seat located behind said occupant seat and further including another net extending across said additional occupant seat and being deployed responsive to a high impact force on said vehicle.

6. The system of claim 1, further including means for automatically adjusting said deployed position to accommodate changes in occupant seat location and the number and sizes of occupants in said occupant seat.

7. The system of claim 1 further including release means, accessible to an occupant restrained by a deployed net, for releasing said net.

8. A protection system for restricting movement of one or more occupants in an occupant seat of a vehicle that is involved in a crash and subject to one or more impact forces from different directions comprising:

sensor means for sensing a high impact force on said vehicle over a frontal angel of about 180 degrees;

a net stored out of the normal view of an occupant in said occupant seat;

a plurality of cables coupled to said net, said cables being hidden from view when said net is in its stored position; and means for tensioning said cables for deploying and locking said net against said occupant seat responsive to activation of said sensor means.

9. The system of claim 8 wherein said net is stored in the roof of said vehicle, forward of said occupant seat.

10. A protection system for restricting movement of one or more occupants in an occupant seat of a vehicle that is involved in a crash and subject to one or more impact forces from different directions comprising:

sensor means for sensing a high impact force on said vehicle over a frontal angle of about 180 degrees;

a net stored out of the normal view of an occupant in said occupant seat;

a pair of cables coupled to said net on each side of said occupant seat, all of said cables being hidden from view when said net is in its stored position;

means for tensioning said cables for deploying and locking said net against said occupant seat responsive to activation of said sensor means; and each of said pair of cables being connected to a top portion of said net with the bottom one of said pair of cables being releasably secured above said occupant seat and being released upon impact such that said net extends downwardly and rearwardly toward said occupant seat during deployment.

11. The system of claim 10 wherein said net has an open weave construction for enabling visibility therethrough and for minimizing air resistance during deployment.

* * * * *

UNITED STATES PATENT AND TRADEMARK OFFICE
CERTIFICATE OF CORRECTION

PATENT NO. : 5,226,672
DATED : July 13, 1993
INVENTOR(S) : Royce H. Husted

It is certified that error appears in the above-identified patent and that said Letters Patent is hereby corrected as shown below:

Column 1, line 16, delete "restraining", insert --restraint--;

Column 2, line 18, delete "restraining", insert --restraint--;

line 51, delete "restraining", insert --restraint--;

Column 4, line 45, delete "larger", insert --large--;

Column 5, line 3, delete "pas", insert --pass--;

line 24, delete "AS", insert --As--;

line 41, delete "larger", insert --large--;

line 50, delete "AS", insert --As--.

Signed and Sealed this

Thirtieth Day of August, 1994

Attest:

BRUCE LEHMAN

Attesting Officer

Commissioner of Patents and Trademarks